Nov. 1, 1932.  B. A. EVANS  1,885,339

RUBBER BEARING STRUCTURE

Filed Sept. 20, 1928

Inventor
Benjamin A. Evans
By Eakin & Avery
Attys.

Patented Nov. 1, 1932

1,885,339

UNITED STATES PATENT OFFICE

BENJAMIN A. EVANS, OF CUYAHOGA FALLS, OHIO, ASSIGNOR TO THE B. F. GOODRICH COMPANY, OF NEW YORK, N. Y., A CORPORATION OF NEW YORK

RUBBER BEARING STRUCTURE

Application filed September 20, 1928. Serial No. 307,098.

This invention relates to bearing structures comprising a member of resilient material such as rubber moving in sliding contact with another member and especially to water-lubricated rubber bearings.

Heretofore such bearing structures usually have been constructed with the rubber bearing portion permanently united, as by vulcanization, to the inner wall of the female member of the bearing or to the shaft, with the result that the structure is difficult and expensive to manufacture and to repair.

The chief objects of this invention are to provide economy in the manufacture of bearing structures of the character described and to provide for economy and facility in the repair of such bearings. A more specific object is to provide for ready and easy replacement of locally worn portions of the bearing and thus avoid the necessity of a more expensive repair.

In attaining these objects I provide a bearing structure, preferably but not necessarily the female part of the bearing, having a sectional bearing portion, each section of which is mountable and longitudinally removable independently of the other sections. The invention is especially applicable to rubber bearing structures having polygonal or fluted bearing surfaces forming an acute angle with the surface of shaft or opposed bearing surface, which are particularly desirable in water-lubricated rubber bearings, and preferably the sections are so formed that each section provides a single flute or plane face of the bearing.

Of the accompanying drawing:

Fig. 2 is a transverse section thereof.

Fig. 3 is an end elevation thereof, a part being broken away for clearness of illustration.

Figure 1:
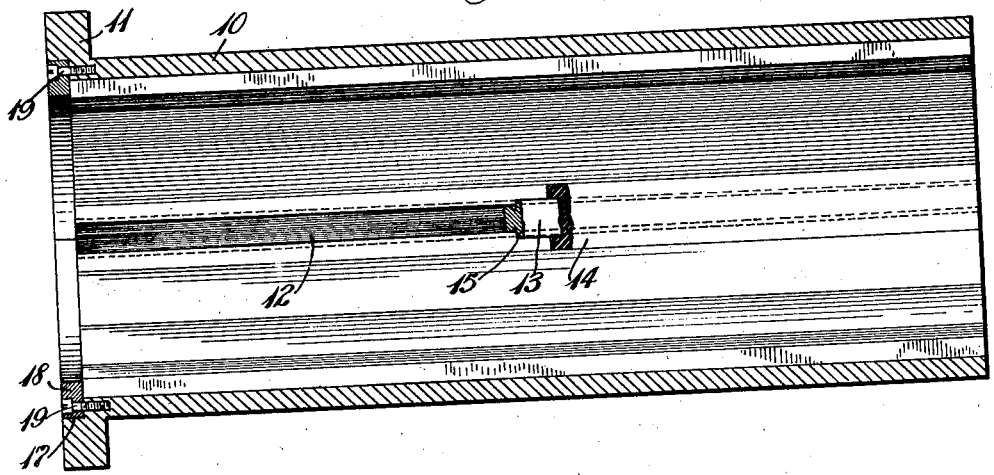
Fig. 1 is a longitudinal section of a bearing structure embodying my invention in its preferred form.
Figure 1:
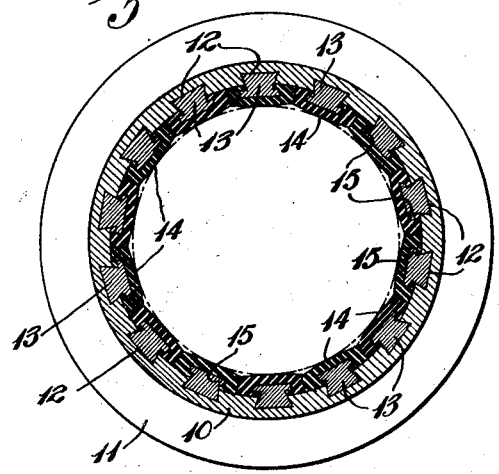
Figure 1:
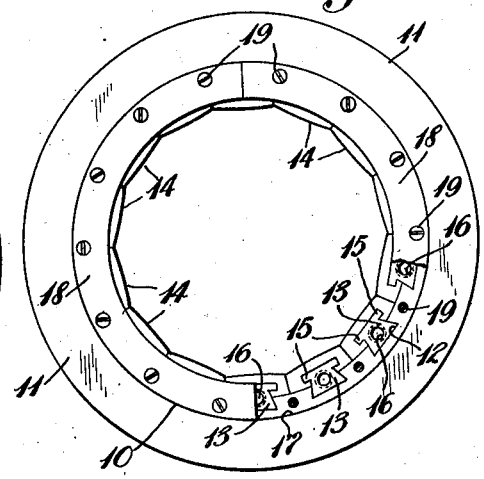

Referring to the drawing, 10 is an outer shell or sleeve, usually of metal and preferably of brass or bronze composition and preferably formed at one end with an outwardly-extending radial flange 11. The flanged end of the sleeve is its outer end when the sleeve is secured in a suitable mounting in a boat or other structure and consequently is easy of access for replacing worn or damaged bearing sections.

The inner surface of the sleeve 10 may be formed with a circumferential series of equally-spaced, longitudinal, undercut grooves 12, 12 which are slightly tapered in width from the flanged end of the sleeve to its opposite end. Mounted in each groove 12 is a metal dove-tail slide 13 upon which a bearing section 14 of resilient, vulcanized rubber composition is mounted, each slide 13 being somewhat thicker than the depth of its groove 12 and having its outer portion formed with lateral flanges 15, 15 which are spaced a substantial distance from the inner face of the sleeve 10. My invention, however, is not limited to such dovetail construction and other fastening means may be used which will permit the longitudinal removal of the bearing sections from the bearing sleeve.

The bearing section 14 of resilient rubber having a soft-rubber shaft-contacting portion forming an acute angle with the surface of the shaft is vulcanized to the slide 13 and surrounds the flanges 15 thereon, the latter thereby being interlocked with the rubber and securely anchored thereto. The under side of the rubber structure 14 is shaped to fit the adjacent face of the sleeve 10, and its lateral faces are inclined so as to be disposed radially thereof, the width of the structure being such that when all the sections are mounted in the sleeve their marginal portions will abut each other, preferably with sufficient pressure to insure a tight joint to prevent lubricant from entering between adjacent sections, and also to afford lateral support for each section and to produce a double interlock whereby excessive strains on the sections where their rubber portions interlock with the metal is obviated. The outer face of each bearing section is convex as shown, or flat, so as to be disposed tangentially of a shaft mounted in the bearing at zero pressure.

Each slide 13 has a threaded bore 16 in its end which is disposed at the flanged end of the sleeve 10 for the application of a suitable pulling tool for removing respective bearing sections, upon occasion, as when it is necessary to replace a worn section.

The flanged end of the sleeve 10 is formed at its inner periphery with a circumferential recess 17, and a two-piece washer 18 is seated in said recess and secured therein by set screws 19, 19 the washer thus being adapted to retain the bearing sections in the sleeve.

The respective bearing sections are easily manufactured by simple molding methods, and worn portions of the bearing are easily and quickly replaced without the expense and delay incident to the replacement of a complete bearing or a single rubber member providing the entire rubber bearing surface.

My invention may be modified within the scope of the appended claims.

I claim:

1. A bearing structure comprising a bearing member and a plurality of individually removable longitudinal bearing sections having rigid attaching portions and shaft-contacting portions of resilient rubber mounted upon the surface thereof, each of said sections having a bearing surface tangentially with relation to a shaft at zero pressure.

2. A bearing structure as defined in claim 1 in which the rubber sections are disposed in laterally-abutting relation.

3. A bearing structure comprising a bearing member, a circumferential series of bearing sections of resilient rubber mounted upon the surface thereof, and means comprising a rigid backing member individual to each bearing section for securing the same to the said bearing member.

4. A bearing structure as defined in claim 3 in which the securing means is interlocked with the rubber of the section and with the bearing member.

5. A bearing structure comprising a bearing member formed with a circumferential series of longitudinal grooves, and respective bearing sections mounted in said grooves, said bearing sections comprising resilient rubber bearing portions in laterally abutting relation outside of said grooves and rigid portions interfitted with said grooves.

6. A bearing structure comprising a bearing member formed with longitudinal grooves defined by bottom surfaces parallel to the axis thereof and side surfaces which taper toward one end of the member, and bearing sections formed with complementally tapered portions interfitting with said grooves and having lateral resilient cooperating faces outside said grooves.

7. A bearing structure comprising a bearing member formed with laterally tapered longitudinal grooves, complementally tapered slides mounted in said grooves, and rubber bearing sections having parallel lateral faces mounted upon respective slides.

8. A bearing structure comprising a bearing member formed with a circumferential series of longitudinal grooves, respective metal slides interfitted with said grooves, and a rubber bearing member mounted upon and interlocked with that portion of each slide outside its groove.

9. A bearing structure as defined in claim 8 in which the bearing members are disposed in laterally abutting relation to provide a double interlock of the rubber bearings and metal slides.

10. A bearing structure comprising a tubular bearing member formed with a circumferential series of longitudinal undercut grooves defined by bottom surfaces disposed parallel to the axis of said member and side surfaces longitudinally inclined toward each other, a plurality of rigid slides provided with complementary groove engaging portions for engagement therewith, and resilient bearing strips mounted on said slides.

In witness whereof I have hereunto set my hand this 17th day of September, 1928.

BENJAMIN A. EVANS.

CERTIFICATE OF CORRECTION.

Patent No. 1,885,339. November 1, 1932.

BENJAMIN A. EVANS.

It is hereby certified that error appears in the printed specification of the above numbered patent requiring correction as follows: Page 2, line 27, claim 1, after "surface" insert "disposed"; and that the said Letters Patent should be read with this correction therein that the same may conform to the record of the case in the Patent Office.

Signed and sealed this 16th day of May, A. D. 1933.

(Seal)

M. J. Moore.
Acting Commissioner of Patents.